May 12, 1964  L. D. DUNN  3,132,677
BLADE FOR SLICING BREAD
Filed Feb. 13, 1962
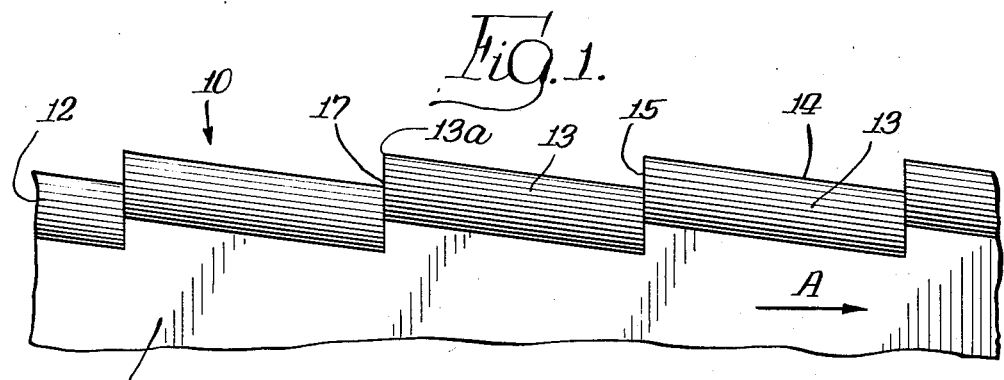
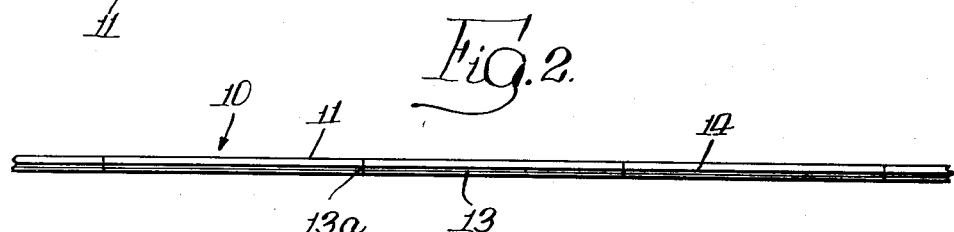
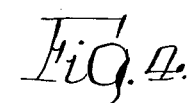
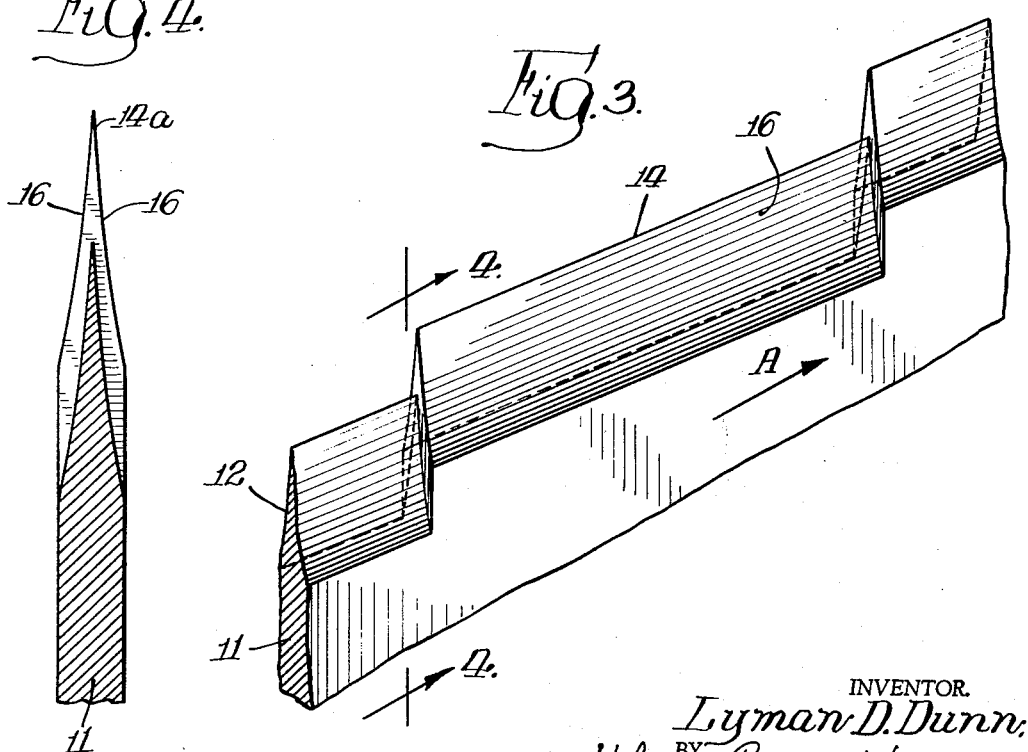
INVENTOR.
Lyman D. Dunn
BY Hofgren, Brady, Wegner,
Allen & Stellman Atty's.

United States Patent Office 3,132,677
Patented May 12, 1964

3,132,677
BLADE FOR SLICING BREAD
Lyman D. Dunn, Chicago, Ill., assignor to Marlan Company, a corporation of Illinois
Filed Feb. 13, 1962, Ser. No. 173,017
1 Claim. (Cl. 146—88)

This invention relates to slicing blades and more particularly to blades used for cutting or slicing bread.

The majority of bread slicing machines currently being used have spaced cutting blades mounted on rotating drums. The loaves of bread are fed through the blades. The cutting edges of these blades are scalloped to provide cutting teeth or tips and generally uniform valleys or gullets therebetween. It becomes apparent that the trailing edge of each tooth or, that part of the scallop facing away from the direction of travel of the blade, is useless to effect any of the slicing action. Further, it is necessary to run the blades at a high rate of speed through the bread which results in the effective use of only a very small portion of the cutting edge of each tooth. This, in turn, causes the blades to wear down faster.

The present invention is designed to overcome the above-mentioned defects by providing for a blade which is usable preferably at a lower rate of speed and with cutting edges which are almost entirely effective in the slicing action of the blade.

It is therefore an object of this invention to provide a new and improved blade.

Another object of this invention is to provide an improved blade for slicing bread adapted for movement having a plurality of angular teeth in the plane of said blade, said teeth defining a cutting edge sloping in the direction of travel of the blade so that the slicing action of the blade is effected by substantially the entire portion of the cutting edge.

Other advantages and objects of the invention will appear from the following detailed description taken in connection with the accompanying drawings, in which:

FIG. 1 is a partially fragmented side elevational view showing an embodiment of the present invention;

FIG. 2 is a plan view of the invention shown in FIG. 1;

FIG. 3 is an enlarged perspective view of the present invention, and;

FIG. 4 is a sectional view taken as indicated along line 4—4 in FIG. 3.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated. The scope of the invention will be pointed out in the appended claims.

Referring more particularly to the drawings, there is shown therein a fragment of a thin endless blade, generally designated 10, embodying the features of the present invention. Preferably, the blade 10 is constructed from a strip or band of thin steel. The blade 10 is seen to comprise a base section 11 and an integral cutting section 12. The cutting section 12 comprises a plurality of longitudinally extending teeth 13 which include leading or cutting edges 14 and trailing edges 15. The leading edges 14 slope in the direction of travel of the blade which is indicated by the arrows A in FIGS. 1 and 3. Preferably, the trailing edges 15 of each of the teeth 13 are substantially perpendicular to the previously mentioned direction of travel of the blade 10. Each leading edge 14 terminates at the trailing edge 15 of the next adjacent tooth as indicated at 17. The opposite side walls 16 of each of the teeth 13 of the blade 10 may be ground to a taper by any suitable means to converge inwardly and cooperate with the leading edges 14 to form the cutting edges 14a. Thus, each of the teeth 13 has a leading edge 14 which constitutes a razor sharp knife edge.

The degree of slope of each of the leading edges 14 determines the notch depth or effective height of each of the teeth 13. Referring to FIG. 1, the notch depth is defined as the distance between the tip 13a of a tooth 13 and the terminal point 17 of the leading edge 14 of the next adjacent tooth, measured perpendicular to the direction of travel of the blade 10.

It is apparent that the notch depth of the teeth on any given blade may vary. Further, a blade may be run at any one of a number of speeds. Therefore, to determine the optimum speed of a blade having a given notch depth and tooth spacing the depth of cut per tooth is calculated for various speeds. The depth cut per tooth is defined as the ratio of the bread speed to the product of the blade speed and the number of teeth per inch, or, D=bread speed/blade speed × teeth/inch. From this figure the effective use of each tooth is easily determined as the ratio of the depth cut to the notch depth.

The following table is illustrative of the calculations to which reference has just been made. For the purpose of simplicity the bread speed has been assumed constant at 50 ft./min. or 12 inches/sec.

| Blade speed, ft/min. | SPACING of TEETH | | | | | | | | | |
|---|---|---|---|---|---|---|---|---|---|---|
| | ½ inch apart | | | | | 1 inch apart | | | | |
| | Teeth/sec. | Depth cut/ tooth, inches | Per cent of each tooth used— notch depth, inches | | | Teeth/sec. | Depth cut/ tooth, inches | Percent of each tooth used— notch depth, inches | | | |
| | | | ½₃₂ | ³⁄₆₄ | ¹⁄₁₆ | | | ½₃₂ | ³⁄₆₄ | ¹⁄₁₆ | ³⁄₃₂ | ⅛ |
| 600 | 240 | ½₀ | | | 80 | 120 | ¹⁄₁₀ | | | | | 80 |
| 720 | 288 | ½₄ | | 88 | 67 | 144 | ¹⁄₁₂ | | | | 83 | 67 |
| 900 | 360 | ½₀ | | 71 | 53 | 180 | ¹⁄₁₅ | | | | 71 | 53 |
| 1,200 | 480 | ½₀ | 80 | 53 | 40 | 240 | ¹⁄₂₀ | | | 80 | 53 | 40 |
| 1,500 | 600 | ½₀ | 64 | 43 | 32 | 300 | ¹⁄₂₅ | | 85 | 64 | 43 | 32 |
| 1,800 | 720 | ½₀ | 53 | 36 | 27 | 360 | ¹⁄₃₀ | | 71 | 53 | 35 | 27 |

The foregoing detailed description has been given for clearness of understanding only, and no unnecessary limitation should be understood therefrom, for some modifications will be obvious to those skilled in the art.

I claim:

A blade for slicing bread comprising: an elongated relatively thin blade adapted to be moved in a longitudinal direction, said blade having a plurality of longitudinally extending angular teeth in the plane of said blade, said teeth each having a leading edge and a trailing edge, each of the trailing edges extending substantially perpendicular to the direction of longitudinal movement of the blade, each of said leading edges defining a cutting edge linearly sloped toward the direction of movement of the blade and terminating at the trailing edge of the next adjacent tooth whereby the slicing action of the blade is effected by a substantial portion of the cutting edge of each of the teeth.

References Cited in the file of this patent

UNITED STATES PATENTS

| | | |
|---|---|---|
| 1,728,254 | Rieske | Sept. 17, 1929 |
| 1,917,889 | Jacques | July 11, 1933 |
| 2,127,861 | Grandriaut | Aug. 23, 1938 |

FOREIGN PATENTS

| | | |
|---|---|---|
| 2,110 | Great Britain | 1883 |
| 1,022,768 | Germany | Jan. 16, 1958 |